Oct. 25, 1960   G. H. BINGHAM, JR   2,957,188
METHOD OF MAKING A WATERPROOF BOOT OF SYNTHETIC RESIN
Filed Jan. 7, 1958   2 Sheets-Sheet 1
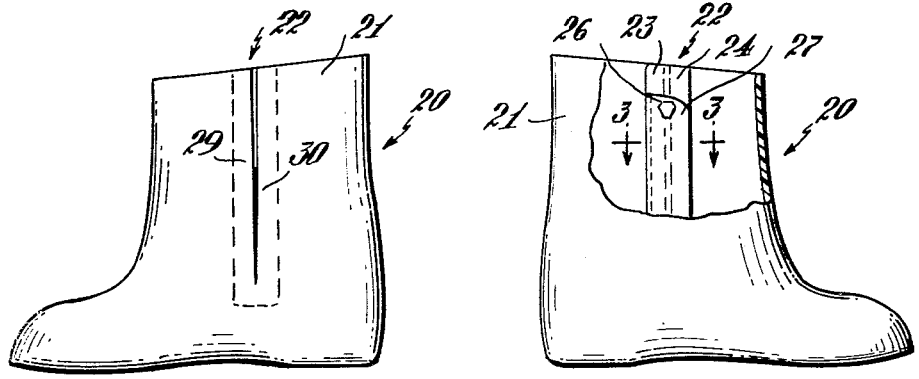
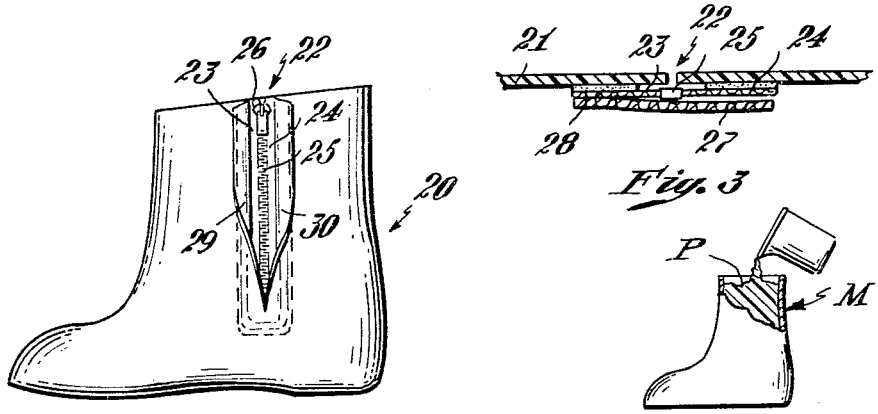
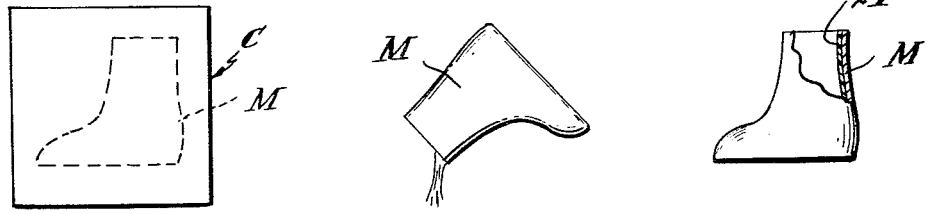
Inventor
George H. Bingham, Jr.

Oct. 25, 1960  G. H. BINGHAM, JR  2,957,188
METHOD OF MAKING A WATERPROOF BOOT OF SYNTHETIC RESIN
Filed Jan. 7, 1958

Inventor
George H. Bingham, Jr.

United States Patent Office 2,957,188
Patented Oct. 25, 1960

2,957,188

METHOD OF MAKING A WATERPROOF BOOT OF SYNTHETIC RESIN

George H. Bingham, Jr., Westminster, Md., assignor to Cambridge Rubber Company, Taneytown, Md., a corporation of Maryland Filed Jan. 7, 1958, Ser. No. 707,505

2 Claims. (Cl. 12—142)

This invention pertains to waterproof footwear, more especially, to footwear wherein the waterproofing material is of synthetic resin rather than rubber and relates more especially to a novel boot and to a method of incorporating a textile tape, for example the tape of a conventional slide fastener or a reinforcing tape, in a waterproof boot in which synthetic resin constitutes the waterproof material. While the present invention is herein referred to for convenience as relating to the manufacture of a boot, it is to be understood that the term "boot," as thus employed, is not to be construed as a limitation, but that the invention is of broad applicability to the manufacture of the other types of footwear such, for example, as overshoes, bootees, or the like.

Footwear, in particular waterproof boots, in which synthetic resin is substituted for rubber are now produced and marketed in very substantial quantities. While such footwear is sometimes made in accordance with a practice substantially like that employed in making conventional rubber footwear, it is also made by other methods, for example by dipping, molding or the like, which result in a boot which, except for trim or lining, if used, is a unitary, single ply article.

In the manufacture of rubber footwear, it is usual to build up the article piece-by-piece on a last and, in following such a procedure, no particular difficulty is experienced in introducing a reinforcing tape or the tapes of a slide fastener into the assembly, the parts then being vulcanized thereby bonding all of the elements firmly together. However, when a boot is made by a molding or dipping method which, in a single step, produces the entire article (except for the trim), the problem of applying a tape is quite different from that which is met with in rubber shoe manufacture.

For good appearance, a boot which includes a slide fastener should be so constructed that, in use and when the slide fastener is closed, the fastener tapes and the interlocking metallic elements of the fasteners are substantially concealed from view. However, the common practice in the trade is to arrange the slide fastener at the inside of the boot after the resin has been cured and with the outer surface of the tapes contacting the inner surface of the boot upper (the actuating slider and the interlocking fastener elements being in the closed position) and then the tapes are bonded to the resin of the upper by a heat-sealing operation. In this operation, pressure and heat, sufficient to cause the thermoplastic resin to become sticky, are applied to the outer surface of the upper along a narrow area adjacent to the outer edges of the respective tapes and extending from the top of the boot to the lower end of the tape of each fastener. The result of this operation is to cause the tapes to adhere firmly to the inside of the upper along those areas to which heat and pressure were applied. Following this operation, an incision is made in the material of the upper, extending from the boot top substantially to the lower end of the series of fastener elements, this incision registering with the meeting edges of those tapes. The fastener is thus made accessible for operation while, at the same time, those portions of the boot upper which intervene between the incision and the two heat-sealed areas are separated to form flaps whose free edges are defined by the incision and which integrally join the upper at the heat-sealed areas. As above noted, for good appearance, these flaps should normally overlie and conceal those portions of the tapes which extend from the heat-sealed areas to the adjacent edges of the tapes when the fastener is closed. However, the operation of heat sealing, as above described, results in a slight shrinkage and transverse tensioning of the upper material which joins the heat-sealed areas, with the result that, when the incision is formed, the flaps have a tendency to curl outwardly so that they do not perform their intended function of concealing the tapes of the fastener element. Thus, boots made in accordance with the above procedure do not present the desired neat appearance when worn which is characteristic of a rubber boot of the same type.

The present invention has for an object the provision of a method of assembling textile tapes, for example the tapes of a slide fastener, with the upper of a boot whose top is of synthetic resin whereby adhesion of the tape to the upper is accomplished without recourse to heat sealing. A further object is to provide a method of making a boot whose upper is of synthetic resin and wherein a slide fastener is employed such as to produce fastener-concealing flaps which have no tendency to curl outwardly so that they function properly to conceal the fastener when the latter is closed. A further object is to provide a method of applying a slide fastener to a boot whose upper consists of a single ply of synthetic resin such as to provide a strong and adequate bond between the fastener tape and the material of the boot upper and which results in the formation of fastener-concealing flaps, each consisting of an integral portion of the upper material, which tend normally to underlie the respective tapes with their free edges substantially in contact. Other and further objects and advantages of the invention will be pointed out in the following more detailed description and by reference to the accompanying drawings wherein:

Fig. 1 is a diagrammatic side elevation, illustrating a boot made in accordance with the present invention and with the slide fastener closed;

Fig. 1a is a view similar to Fig. 1, but showing the fastener exposed for operation;

Fig. 2 is a view similar to Fig. 1, but showing the opposite side of the boot, with a portion broken away to show the interior of that side to which the slide fastener is secured;

Fig. 3 is a fragmentary, diagrammatic section on the line 3—3 of Fig. 2, but to larger scale;

Fig. 4 is a small scale diagrammatic view, illustrating a preliminary step in the formation of a boot of the type to which the present invention relates;

Fig. 5 is a diagrammatic view, illustrating a succeeding step in the operation;

Fig. 6 is a view illustrating another step in the operation;

Fig. 7 is a diagrammatic view to small scale, showing the mold, with a part broken away, with the layer of jelled and dried plastic, constituting the embryo boot, in readiness for the application of a slide fastener;

Figure 9:
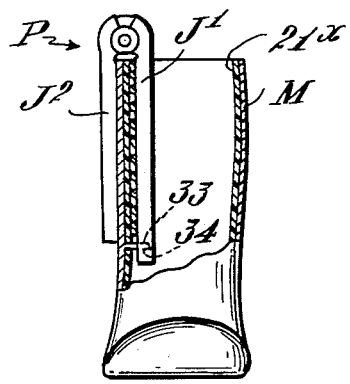
Fig. 9 is a diagrammatic front elevation, to larger scale than Fig. 7, with portions of the mold and embryo boot broken away and in vertical section, illustrating one step in the method of applying a slide fastener to the upper of the boot.

Referring to the drawings, the numeral 20 designates a waterproof bootee made in accordance with the present invention and here shown as unlined, although, it is within the scope of the invention to make similar articles in which a lining is incorporated. It is further to be understood that, while a simple type of bootee is here illustrated, this is by way of example only and that the method may be applied to other articles of footwear as may be desired. As illustrated, the bootee comprises the top or upper portion 21 which is provided at one side with an opening 22, normally closed by a slide fastener F (Fig. 8) of a conventional type, including a pair of flexible tapes 23 and 24, usually of textile material, which support complementary series of fastener elements 25 with which cooperates the customary slider 26. While, as illustrated, the opening 22 is at one side of the bootee, it is to be understood that the opening may be at any part of the bootee, whether at one side or the other, or at the front or rear. As shown in Fig. 2, it is preferred to provide the fastener with an interior flap 27 secured to the outer edge of one of the tapes, for example the tape 23, by means of a sewed seam 28. Such a flap is desirable to protect the wearer's foot from contact with the metal of the fastener and to assist in preventing leakage from the exterior. However, such flap is not essential.

At opposite sides of the fastener, integral portions 29 and 30 of the wall of the bootee form separable flaps for concealing the fastener when the bootee is in use. These flaps normally occupy the position shown in Fig. 1 where their proximate edges are closely adjacent and, in fact, may actually contact. These flaps 29 and 30 only turn back to expose the fastener in response to the downward plow-like action of the slide 26 in opening the fastener, although in Fig. 1a, the slide is still shown as in the closing position.

In making a bootee, such as above described and such that the flaps 29 and 30 normally tend to occupy the position shown in Fig. 1, the following procedure is suggested as desirable, although, so far as the preparation of the embryo bootee is concerned, it is contemplated that other specific procedures may be employed. As illustrated in Fig. 4, a metallic mold M is provided, the inner surface of which is of a contour and dimensions like that of the outer surface of the boot which is to be made except that the inner surface of the mold is in reverse as respects the outer surface of the boot. Having provided such a mold, it is filled with a fluid synthetic resin as indicated at P, Fig. 4, the resin being that which is to form the upper of the bootee. Having filled the mold to the desired depth, corresponding to the height of the bootee to be made, the mold may be placed in an oven C, Fig. 5, where it is subjected to a suitable temperature for a predetermined period of time until a coating of the desired thickness of coagulated or jelled resin has formed on its inner surface. The mold is then removed from the oven and such flush plastic as remains within it is poured out as indicated in Fig. 6. The mold is held in inverted position, after the liquid has been drained out, until the coating on its inside has dried or set sufficiently so that it will not flow. Then, the mold is turned right-side up to the position shown in Fig. 7. The coating $21^x$ on the inside of the mold M forms the embryo bootee to which the fastener is to be applied. This technique of forming an embryo bootee is well-known and is commonly referred to as "slush molding." This process is set forth, for example, in United States Patent No. 2,588,571.

Figure 8:
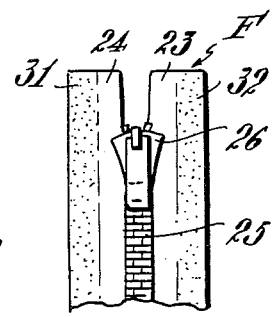
Fig. 8 is a fragmentary elevation, showing the outer side of a slide fastener of conventional form prepared in readiness for application to the embryo boot in accordance with the method of the present invention.
Figure 14:
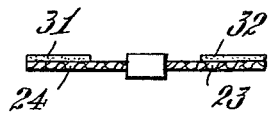
Fig. 14 is a diagrammatic section, illustrating one method of preparing the tape for incorporation in the boot; and, Fig. 15 is a view similar to Fig. 14, but illustrative of an alternative procedure.
Figure 15:
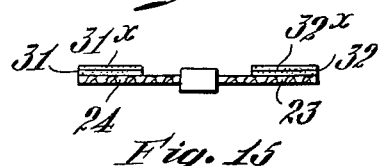

A conventional slide fastener F is illustrated in Fig. 8, to larger scale than in Fig. 2. Preparatory to assembling the fastener with the embryo bootee $21^x$, it is preferred to apply to that surface of each of the tapes (which is to be the outer surface in the completed bootee) a coating 31 and 32, respectively (Figs. 8 and 14), of an adhesive substance, which may be a synthetic resin adhesive of a type which adheres firmly to the resin used in making the embryo bootee. Preferably this synthetic resin adhesive is the same or a resin similar to the resin used in making the bootee. As shown in Fig. 8, the coatings 31 and 32 do not cover the entire surface of the respective tape, but are confined to strips adjacent to the outer edges of the tapes. While a single coating is usually sufficient, in accordance with the procedure which is described immediately hereafter, it may be desirable, in accordance with an alternative procedure, later described, to apply to each tape a second coating as illustrated in Fig. 15 wherein the second coatings $31^x$ and $32^x$ are only applied after the first coatings 31 and 32 have completely set or fused. When a single coating is to be employed, this coating is merely dried but not fused before the tape is assembled with the embryo upper, it being recalled that the latter has been dried but not fused.

In assembling the tape with the upper, a clamping appliance, diagrammatically indicated at P (Fig. 9) or its equivalent, may be employed. This appliance comprises an inner jaw $J^1$ and an outer jaw $J^2$. These jaws are desirably hinged together at their upper ends and with provision of some conventional means, not here illustrated, tending to swing them toward each other with substantial force. Such means may, for example, consist of a heavy coiled spring coaxial with the pivot which unites the jaws or, if preferred, some means such as a screw device may be employed for positively drawing the jaws toward each other.

The inner jaw $J^1$ is of a width at least as great as the total width of the fastener F and may, if desired, be provided at its inner surface with means for temporarily securing the fastener tapes thereto. For instance, it may be provided with sharp, pointed prongs; or, it may have a coating of permanently tacky material such, for example, as the coating of what is known as a "Scotch tape." As shown in Fig. 9, where the clamping device is applied to the side wall of the bootee, the opposed faces of the jaws $J^1$ and $J^2$ may be substantially straight, but if the fastener is to be applied to the front of the bootee, for example, the opposed faces of the jaws will be curved to conform to the curvature of the part of the bootee.

Figure 10:
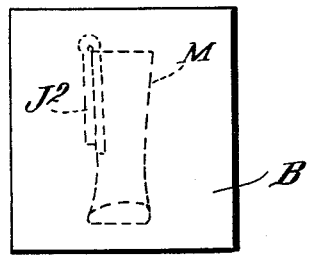
Fig. 10 is a diagrammatic front view, showing a curing oven having therein the mold and assembled parts as illustrated in Fig. 7.
Figure 12:
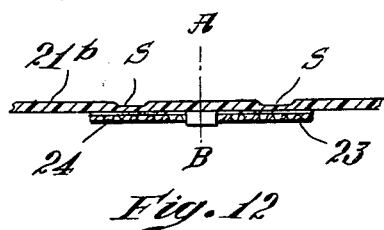
Fig. 12 is a diagrammatic, transverse cross section through a boot upper, illustrative of an early step in the prior customary method of applying a slide fastener to a boot top.
Figure 13:
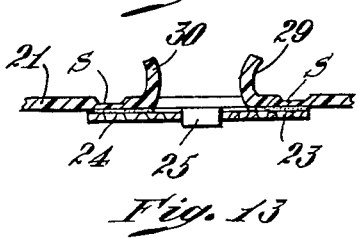
Fig. 13 is a view similar to Fig. 12, but showing the results of such method after the material of the boot has been incised to free the slide fastener for operation.

Preparatory to assembling the tape with the embryo upper, the tape is applied to the jaw $J^1$ while the jaws of the device P are separated, and the jaw $J^1$ is moved downwardly into the upper at the desired location of the fastener. Desirably, the interior of the mold M is provided, as shown in Fig. 9, with an inwardly directed projection 33 and the lower part of the jaw $J^1$ is provided with an opening 34 to receive this projection, the projection and opening providing means whereby the jaw $J^1$ may be accurately located with reference to the desired position of the tape. Having thus introduced the tape into the interior of the embryo bootee at the desired location, the jaw J² is swung down to contact the outer surface of the mold. The jaws are then caused to approach with substantial pressure by such means as above described or otherwise and held in clamping position while the entire assembly is placed within an oven B, Fig. 10, where it remains for a predetermined period and at a proper temperature such as to complete the curing of the bootee and to produce a permanent bond between the coated surfaces of the tapes and the interior of the bootee. When this condition has been arrived at, the assembly is removed from the oven B, the jaws of the clamping device are separated, and the coating of resin is stripped off from the inside of the mold as a substantially completed bootee with the slide fastener incorporated therein. After removal from the mold, an incision is made in the wall of the bootee along the line indicated at A—B, Fig. 11, in line with the united fastener elements 25, thus producing the two flaps 29 and 30 which form integral portions of the outer wall of the bootee. Since the wall of the bootee has not been subjected to any appreciable transverse tension stress in applying the fastener, these flaps show no tendency to curl so that their inner edges remain in substantial contact except when the fastener slide is moved downwardly to permit donning and doffing of the bootee. The flaps, as thus provided, insure that the bootee will have the desired neat appearance, with the fastener substantially concealed during use. This is in marked contrast with the results of previous procedures for incorporating a slide fastener in a plastic boot, such prior procedure being diagrammatically indicated in Figs. 13 and 14 wherein the outer wall of the bootee is indicated at 21ᵇ and the fastener tapes at 23 and 24. In the prior procedure, the bootee was completely fused before the fastener was assembled therewith. In assembling the fastener with the bootee, the fastener tapes are pressed into direct contact with the inner surface of the wall 21ᵇ of the bootee and then heat and pressure is applied to the outer surface of the wall 21ᵇ along the lines indicated at S, Fig. 12, the heat and pressure being such as to melt the material of the wall 21ᵇ sufficiently to cause it to bond to the adjacent tapes. The application of sufficient pressure and heat at these points produces indentations as indicated at S and stresses the material intervening between these indentations so that it has a tendency to contract transversely of the wall of the bootee. When the incision is made in such a bootee along the line A—B to permit operation of the fastener slide, the flaps 29 and 30 resultant from the making of the incision have a strong tendency to shrink and curl as shown in Fig. 13 so that they do not properly conceal the fastener. For this reason, plastic boots, as heretofore made, in which a slide fastener is employed have not presented the neat appearance desired or that which is obtained in rubber boots made by customary procedures.

Figure 11:
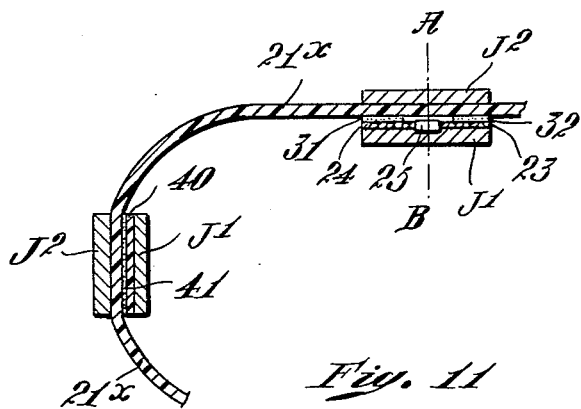
Fig. 11 is a fragmentary horizontal section to large scale, illustrating a step in the method of applying the slide fastener of Fig. 8 to the embryo boot and also showing, in a similar way, the application of a reinforce tape to the rear portion of the boot.

While the present method of applying textile tapes to the interior of a plastic bootee is particularly useful in assembling a slide fastener with such a bootee, it is likewise applicable to the assembly of other tapes. In such a boot, for example, it is sometimes desired to apply a reinforce tape to the interior of the boot at one point or another to provide a tape of slippery material, for example nylon, at the rear of the boot to facilitate donning the boot. As illustrated in Fig. 11, such a slippery tape is indicated at 40 with a coating of adhesive at 41 between it and the interior surface of the embryo bootee 21ˣ, a clamping device having the jaws J¹ and J² being shown in position for holding the tape 40 in place during the fusing operation.

The above-described method of procedure is predicated upon the assumption that the tape will be assembled with the embryo bootee before the latter has been completely fused. By a slight modification of the procedure, it is possible to assemble a tape or the tapes of a slide fastener with the bootee after the latter has been completely fused which has some advantages, in particular, that the assembly of the tape with the bootee may be delayed as long as desired after the bootee has been molded. In carrying out this modified procedure, the tape or tapes is or are coated as above described and, as illustrated in Fig. 14, with a material which, in this instance, need not be necessarily adhesive in character but which is absorbed into the pores of the tape and thus fills the pores and makes the tape substantially impermeable. However, this first coating may be of the same type as that above described, that is to say, a resinous adhesive similar to that forming the embryo bootee. Having applied this first coating of impregnant and having permitted this coating to fuse or set, a second coating, as shown in Fig. 15 indicated at 31ˣ and 32ˣ, is applied to that surface of the tape which is to contact the inner surface of the boot. Since the first coating filled the pores of the tapes, the second coating remains on the surface where it forms a layer which is adequately effective to bond the tape to the material of the bootee. This second coating is of a synthetic resin which is again a good adhesive for the material of the boot top and is dried but is not completely fused or set. In this condition, the tapes are assembled with the boot top in the same way as above described and, by the use of a clamping device, for example such as the device P or equivalent means, the assembled parts are subjected to pressure (desirably while heat is applied) until the second coating on the tapes has completely set and become permanently bonded to the material of the boot top. The incision may now be made in the wall of the boot to release the slider and the boot is ready for use.

It is to be understood that the tape may be made impermeable by a first coating or equivalent treatment, before the adhesive coating is applied, all as above suggested, whether the assembly of the tapes with the upper takes place before or after the upper is fused or cured. However, that method in which the upper is fully fused before the assembly of the tapes therewith has certain advantages, in particular, that it makes it possible for the manufacturer to make up the boots in any desired quantity and place them in storage and then, when it is convenient, complete them by the incorporation of the fasteners.

While certain desirable embodiments of the invention have herein been illustrated and described by way of example, it is to be understood that the invention is broadly inclusive of any such modifications of materials or procedure as fall within the scope of the appended claims.

I claim:

1. That method of making a boot whose upper, at least, comprises a continuous ply of synthetic thermoplastic resin and which has an opening extending downwardly from its upper edge which is normally closed by a conventional slide fastener of the type which comprises two flexible textile tapes each carrying one of a series of complemental fastener elements, and with provision for concealing said tapes and fastener elements from view when the fastener is closed, said method comprising as steps, providing a slide fastener comprising a plurality of flexible tapes each having a coating, on that side which is to be the outermost, in the completed boot, with an incompletely cured adhesive material capable of making a good bond with the synthetic resin of the upper, disposing said slide fastener at the desired location within the boot, while the latter consists of a shape-retaining but incompletely cured coating of synthetic resin upon the inner surface of a substantially rigid hollow mold, with the coated surface of the tapes in contact with the resin forming the upper, applying pressure such as to produce intimate contact of the coated tapes with the resin of the upper, maintaining such pressure while subjecting the mold, the embryo-upper and tapes to a heat treatment which concomitantly completes the curing of the resin and forms a permanent bond between the tape coatings and the resin of the upper, thereafter releasing said pressure, removing the boot from the mold, and incising the cured upper along a line which registers with the adjacent edges of the tapes, thereby producing flaps integral with the upper which tend normally to cover and conceal the exposed fastener.

2. The method of making a boot according to claim 1, wherein said pressure is applied by clamping the mold, the embryo upper and fastener tapes between relatively movable parts.

References Cited in the file of this patent

UNITED STATES PATENTS

| | | |
|---|---|---|
| 1,834,582 | Griffiths | Dec. 1, 1931 |
| 1,992,386 | Miller et al. | Feb. 26, 1935 |
| 2,504,705 | Leguillon | Apr. 18, 1950 |
| 2,552,064 | Rollmann | May 8, 1951 |
| 2,566,520 | Fitterling | Sept. 4, 1951 |
| 2,588,571 | Porter | Mar. 11, 1952 |
| 2,650,185 | Larson et al. | Aug. 25, 1953 |
| 2,674,559 | Zobel | Apr. 6, 1954 |
| 2,701,222 | Hetzel et al. | Feb. 1, 1955 |